United States Patent [19]

Fukuzawa et al.

[11] Patent Number: 5,445,568
[45] Date of Patent: Aug. 29, 1995

[54] CHAIN GUIDE STRUCTURE

[75] Inventors: Sumiko Fukuzawa; Shinichi Nakano; Hiroshi Yamaura, all of Saitama, Japan

[73] Assignee: Honda Giken Kogyo Kabushiki Kaisha, Tokyo, Japan

[21] Appl. No.: 297,890

[22] Filed: Aug. 30, 1994

[30] Foreign Application Priority Data

Aug. 30, 1993 [JP] Japan ................. 5-051669 U

[51] Int. Cl.⁶ ............................................. B62J 13/00
[52] U.S. Cl. .................................................... 474/144
[58] Field of Search ............... 474/144, 146; 280/304.3

[56] References Cited

U.S. PATENT DOCUMENTS

| 1,538,853 | 5/1925 | Hazelton | 474/144 |
| 1,717,431 | 6/1929 | Blanchard et al. | 474/144 X |
| 1,783,978 | 12/1930 | Perry | 474/146 X |
| 2,210,135 | 8/1940 | Tautz et al. | 474/146 X |
| 2,295,582 | 9/1942 | Ingiuer | 474/144 X |
| 3,724,582 | 4/1973 | Wood | 474/144 X |
| 3,829,110 | 8/1974 | Ray | 280/8 |
| 4,425,105 | 1/1984 | Edl et al. | 474/146 X |
| 4,471,851 | 9/1984 | Kamiya et al. | 474/144 X |
| 4,487,424 | 12/1984 | Ellis | 474/144 X |
| 4,850,314 | 7/1989 | Villa | 474/146 X |
| 4,869,708 | 9/1989 | Hoffmann et al. | 474/144 X |
| 5,116,285 | 5/1992 | Wahl | 474/144 |

FOREIGN PATENT DOCUMENTS 1-27512 1/1989 Japan .

OTHER PUBLICATIONS

Patent Abstracts of Japan, M-1532, Dec. 20, 1993, vol. 17, No. 697, JP No. 5-238452.
Patent Abstracts of Japan, M-1539, Jan. 11, 1994, vol. 18, No. 13, JP No. 5-254468.
Patent Abstracts of Japan, M-1467, Aug. 23, 1993, vol. 17, No. 459, JP No. 5-105150.
Patent Abstracts of Japan, M-998, Jul. 13, 1990, vol. 14, No. 327, JP No. 2-109787.
Patent Abstracts of Japan, M-984, Jun. 14, 1990, vol. 14, No. 276, JP No. 2-81782.
Patent Abstracts of Japan, M-930, Feb. 2, 1990, vol. 14, No. 58, JP No. 1-282080.

*Primary Examiner*—Roger J. Schoeppel

[57] ABSTRACT

A chain guide structure having, in combination, a chain cover and a chain guide member which can easily and securely be placed on the chain cover for temporary assembling, and capable of improving the efficiency of the assembling work. A chain guide structure for guiding a chain wound round a driving sprocket supported on the sidewall of a crankcase and covered with a cover attached to the sidewall includes an elastic chain guide member having a substantially semicircular shape opening toward the rear and supported on the inner surface of the cover so as to extend along the chain. At least two ribs are formed on the inner surface of the cover so as to hold the chain guide member by elastically deforming the chain guide member so that the width of the open end of the chain guide member is changed.

30 Claims, 6 Drawing Sheets

CHAIN GUIDE STRUCTURE

BACKGROUND OF THE INVENTION

1. Field of the Invention

The present device relates to a chain guide structure to be incorporated into a motorcycle.

2. Description of Background Art

When mounting a chain guide to extend along a chain wound round a driving sprocket supported on the sidewall of a crankcase on the engine together with a cover to be attached to the sidewall of the crankcase so as to cover the driving sprocket, the chain guide is placed temporarily on the inner surface of the cover. The cover temporarily holding the chain guide is positioned on the sidewall of the crankcase so as to cover the sprocket, and then the chain guide and the cover are fastened together to the sidewall of the crankcase with screws.

A first conventional chain guide structure, as disclosed in Japanese Utility Model Publication No. 1-27512, includes a chain guide provided with projections on its outer surface and a chain cover provided with recesses in its inner surface. The chain guide and the chain cover are assembled temporarily by inserting the projections of the chain guide into the recesses of the cover. The first conventional chain guide structure has a complicated construction because the chain guide must be provided with projections and the chain cover must be provided with recesses.

A second conventional chain guide structure includes a chain guide provided with holes and a chain cover provided with projections in its mating surface. The chain guide and the chain cover are assembled temporarily by placing the chain guide on the chain cover so as to receive the projections of the chain cover in the holes of the chain guide, respectively.

A third conventional chain guide structure is formed by welding a chain guide to a chain cover. The third conventional chain guide structure requires a welding process. Once welded together the chain guide and the chain cover cannot individually be replaced with a new one because the chain guide is welded to the chain cover.

SUMMARY AND OBJECTS OF THE INVENTION

The present device overcomes the problems in the conventional chain guide structures.

It is an object of the present device to provide a chain guide structure having a simple construction and including a chain guide and a cover which can securely placed together in a temporary assembly.

With the foregoing object in view, the present device provides a chain guide structure for guiding a chain wound round a driving sprocket supported on the sidewall of a crankcase and covered with a cover attached to the sidewall. An elastic chain guide member is provided having a substantially semicircular shape opening toward the rear and supported on the inner surface of the cover so as to extend along the chain. At least two ribs are formed on the inner surface of the cover so as to hold the chain guide member firmly by elastically deforming the chain guide member so that the width of the open end of the chain guide member is changed.

The cover needs only to be provided with at least two ribs. The ribs can be formed integrally with the cover, and the chain guide is deformed elastically and placed on the cover for temporary assembling so as to press itself resiliently against the ribs. Accordingly, the chain guide structure has a simple construction, the chain guide member can securely be held on the cover, and the chain guide member will not fall off the cover even if the cover is held with the surface holding the chain guide member facing down, so that the assembling work for putting the chain guide and the cover on the crankcase can be carried out with an improved efficiency.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

A chain guide structure in a preferred embodiment according to the present device shown in FIGS. 1 to 12 will be described hereinafter.

Figure 1:
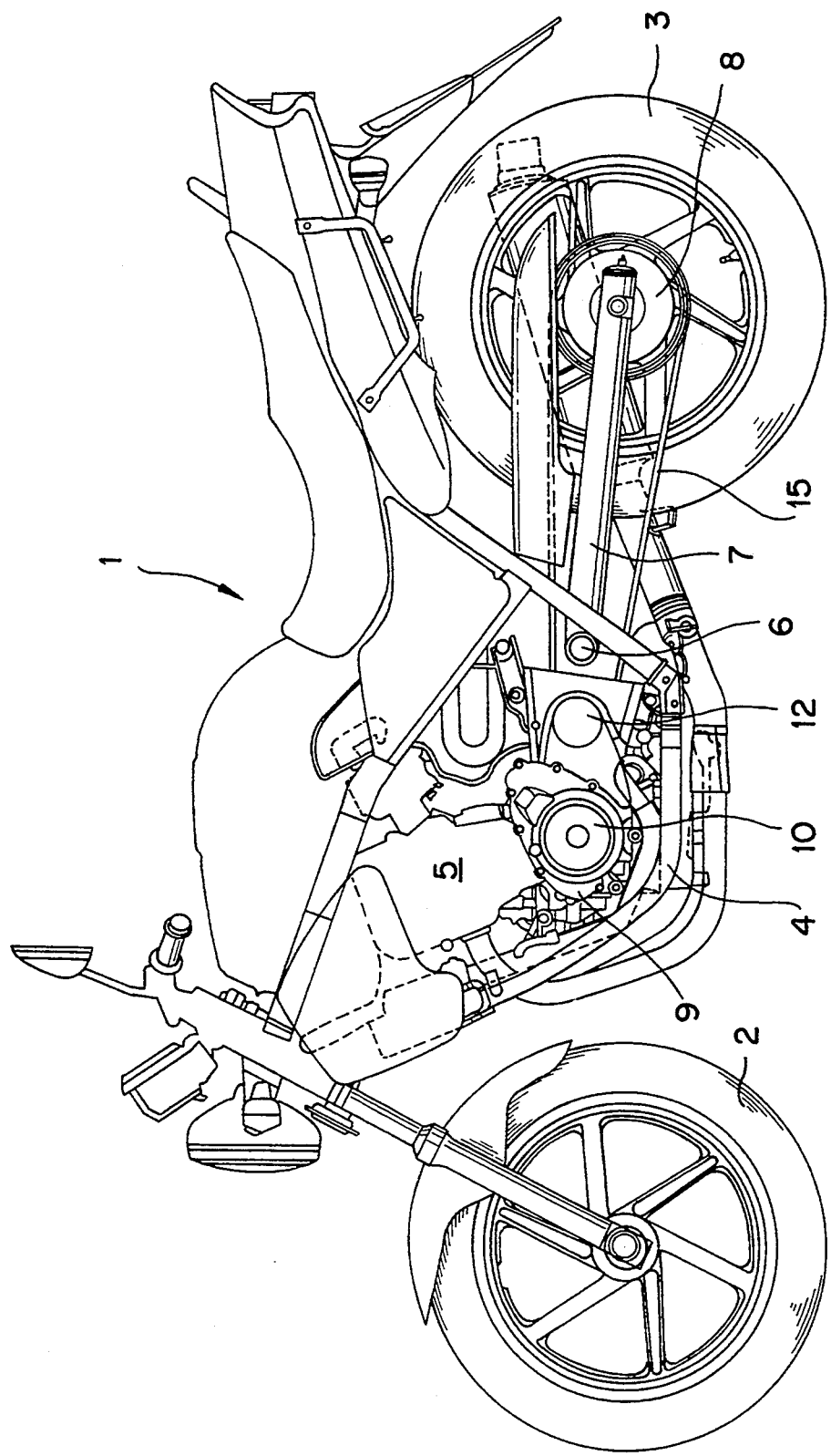
FIG. 1 is a side view of a motorcycle employing a chain guide structure in a preferred embodiment according to the present invention.

FIG. 1 is a side view of a motorcycle 1 provided with the chain guide structure in accordance with the present device. A four-cycle two-cylinder engine 5 is supported on a main frame 4 at a position between a front wheel 2 and a rear wheel 3.

The rear wheel 3 is supported on the rear end of a rear fork 7 which is pivotally supported at its front end by a pivotal shaft 6 on the main frame 4 so as to swing vertically on the pivotal shaft 6, and a driven sprocket wheel 8 is mounted fixedly to a rear axle supporting the rear wheel 3.

Figure 2:
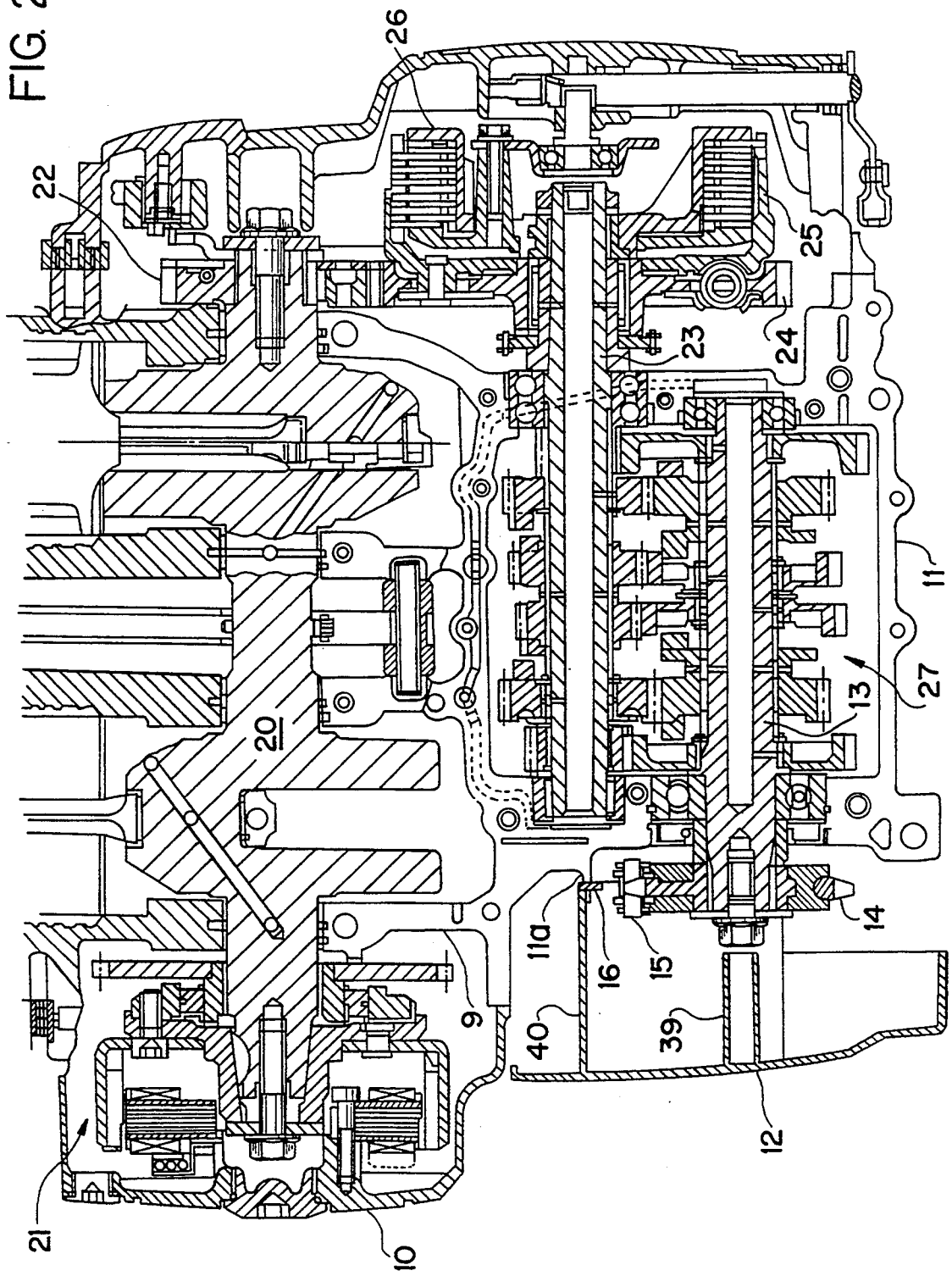
FIG. 2 is a fragmentary sectional view of an engine for the motorcycle of FIG. 1.
Figure 3:
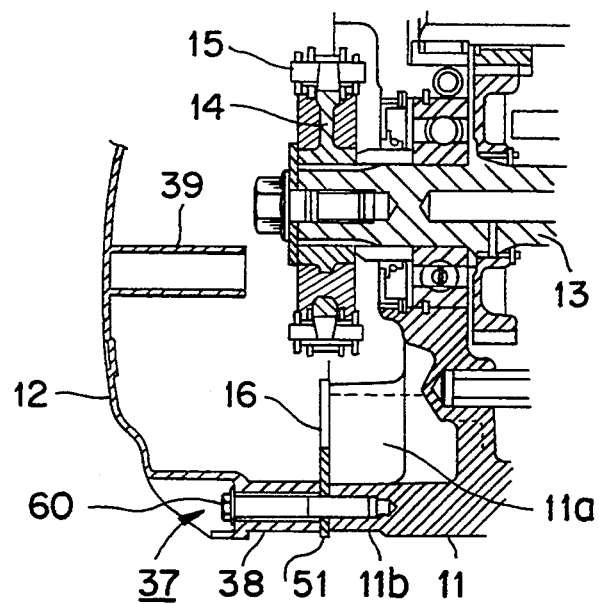
FIG. 3 is a sectional view of a portion of the engine of FIG. 2 pertinent to the present invention.

The side surface of the crankcase 9 of the engine 5 is covered with a crankcase cover 10. The side surface of a transmission case 11 formed integrally with the crankcase 9 extends rearwardly from the crankcase 9 and is covered with a chain cover 12. A driving sprocket wheel 14 mounted on the output shaft 13 of the engine 5 is covered with the chain cover 12 as shown in FIGS. 2 and 3. A chain 15 extends between the driving sprocket wheel 14 and the driven sprocket wheel 8 to transmit power to the rear wheel 3.

FIG. 2 is a fragmentary sectional view of the engine 5, in which the cylinder unit of the engine 5 is omitted. A generator 21 is disposed at the left end of a crankshaft 20 and the generator 21 is covered with the crankcase cover 10.

A gear 22 mounted on the right end of the crankshaft 20, is engaged with a gear 24 attached to an outer clutch hub 25 which is supported on a main shaft 23 for free rotation relative to the main shaft 23.

An inner clutch hub 26 capable of being brought into engagement with and disengaged from the external clutch hub 25 is fixedly mounted on the main shaft 23. The rotation of the main shaft is transmitted through gears 27 for providing speed change ratios to the output shaft 13.

Referring to FIGS. 2 and 3, the output shaft 13 extends through the left wall of the transmission case 11 and the driving sprocket wheel 14 is securely mounted on the left end of the output shaft 13 projecting from the left wall of the transmission case 11.

The chain cover 12 covering the driving sprocket wheel 14 has an open rear end through which the chain 15 extends rearwardly between the driving sprocket wheel 14 and the driven sprocket wheel 8.

The shape of the chain cover 12 will be described hereinafter with reference to FIGS. 4 to 10. The chain cover 12 has a sidewall 30, an upper wall 31 formed by inwardly bending the upper portion of the sidewall 30, and a lower wall 32 formed by inwardly bending the lower portion of the sidewall 30. The front end 33 and the rear end 34 are bent slightly inward. The chain cover 12 has a substantially U-shaped cross section.

Figure 4:
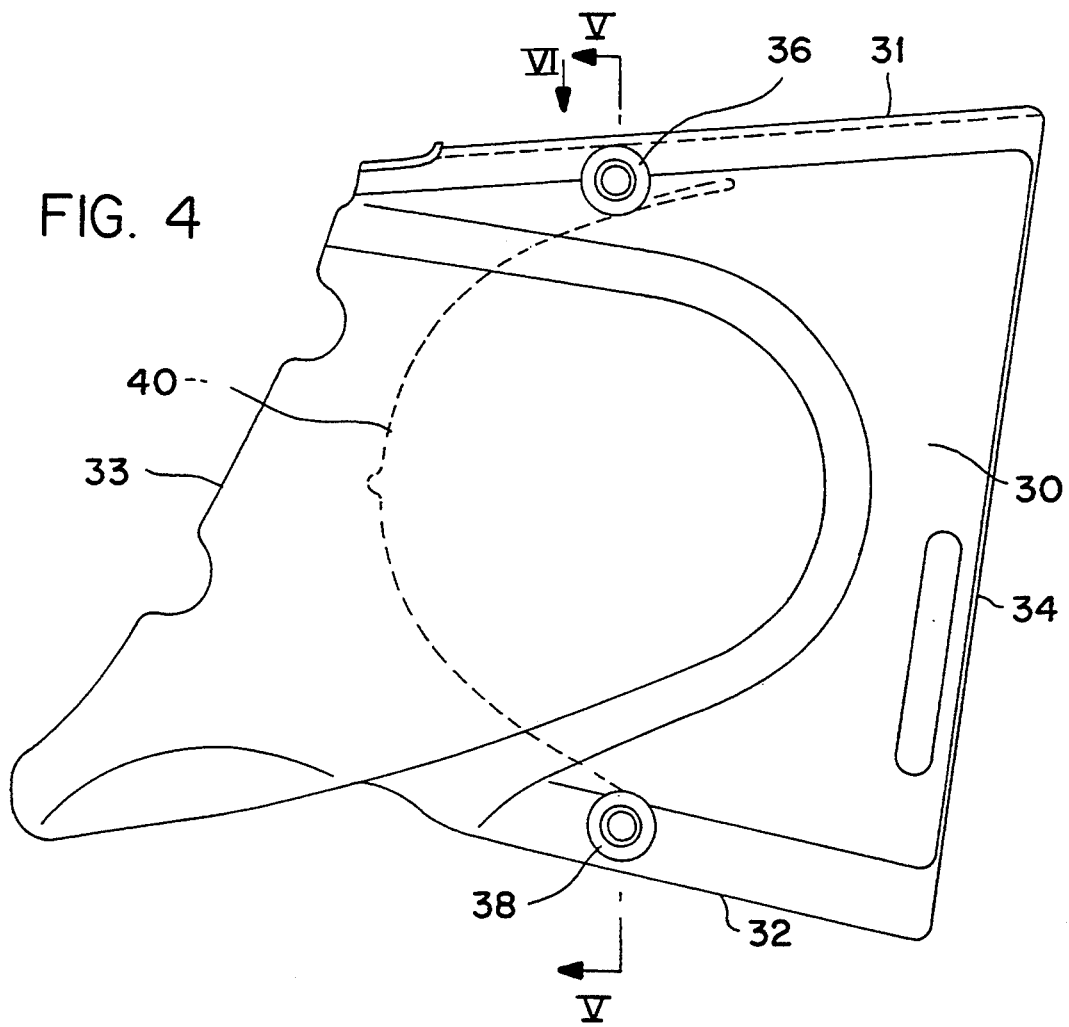
FIG. 4 is a front view of a chain cover, showing the outer surface of the chain cover.
Figure 5:
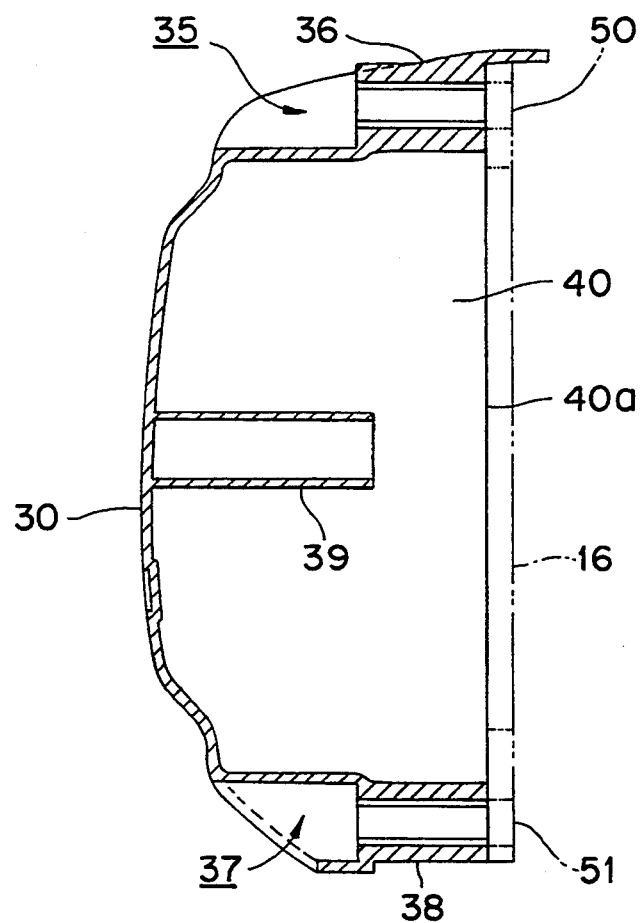
FIG. 5 is a sectional view taken on line V—V in FIG. 4.
Figure 6:
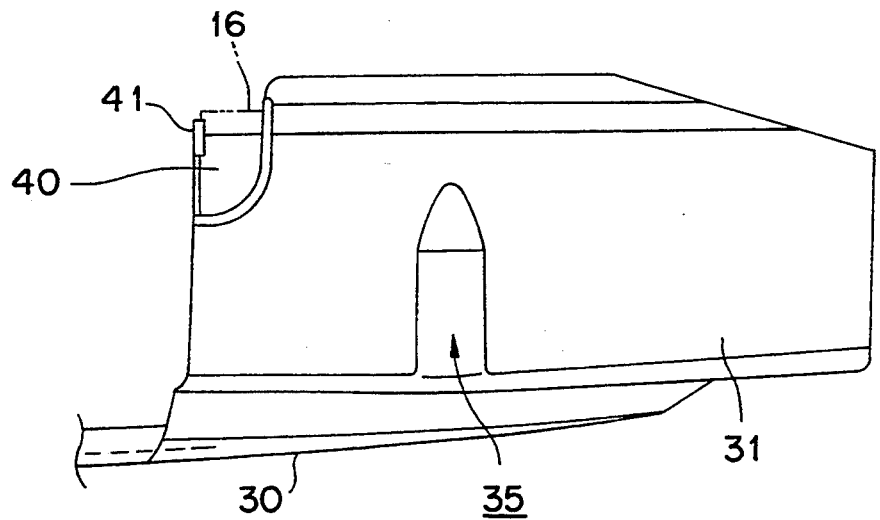
FIG. 6 is a view taken along the direction indicated by the arrow VI in FIG. 4.

Referring to FIGS. 4 to 6, a depression 35 having a semicircular cross section is formed in substantially a middle section of a curved portion of the chain cover 12 between the sidewall 30 and the upper wall 31 so that a portion of the curved portion bulges inward to form a cylindrical boss 36.

Similarly, a depression 37 is formed in substantially a middle section of a curved portion of the chain cover 12 between the sidewall 30 and the lower wall 32 so that a portion of the curved portion bulges inward to form a cylindrical boss 38.

Figure 7:
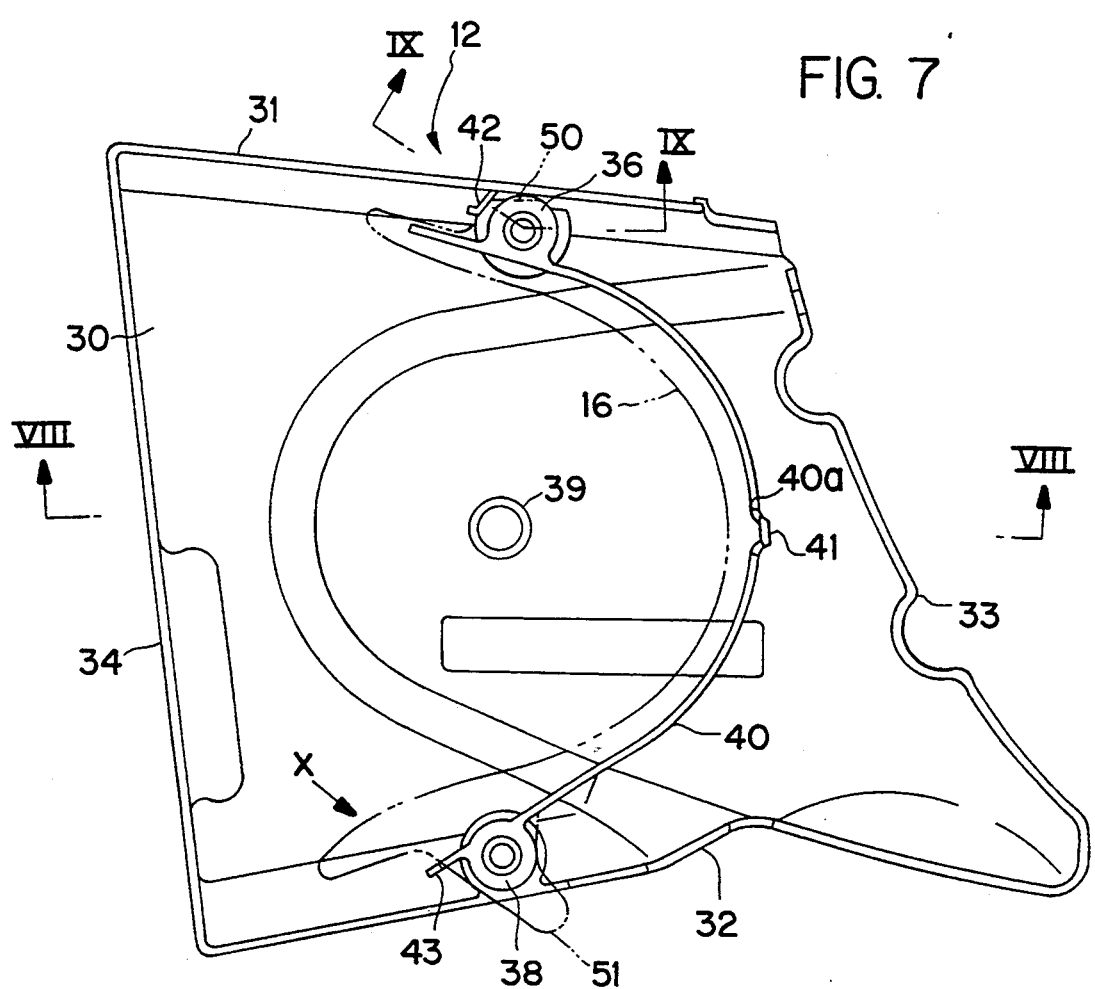
FIG. 7 is a front view of the chain cover, showing the inner surface of the chain cover.
Figure 8:
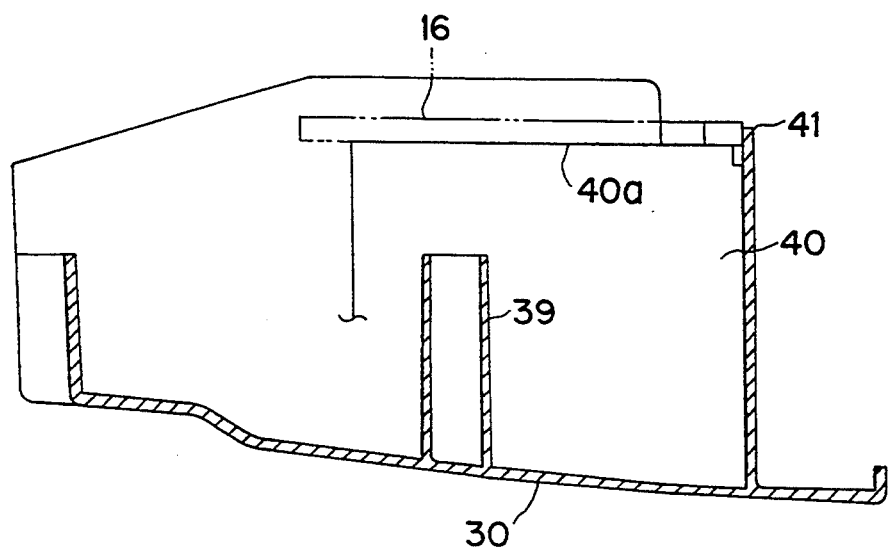
FIG. 8 is a sectional view taken on line VIII—VIII in FIG. 7.

As shown in FIGS. 7 and 8, a cylindrical projection 39 projects from substantially the middle portion of the inner surface of the sidewall 30 of the chain cover 12. A substantially semicircular ridge 40 is formed on the inner surface of the sidewall 30 so as to extend between the upper cylindrical boss 36 and the lower cylindrical boss 38. The substantially semicircular ridge 40 is positioned about the cylindrical projection 39.

The end surface 40a of the ridge 40, and the end surfaces of the cylindrical bosses 36 and 38 are included in a plane so as to be in contact with the end surface of a chain guide member 16, which will be described later.

Part of the middle portion of the ridge 40 protrudes slightly outward and inward beyond the end surface 40a of the ridge 40 to form a rib 41 as shown in FIG. 7 and 8.

Figure 9:
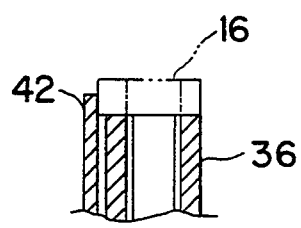
FIG. 9 is a sectional view taken on line IX—IX in FIG. 7.

A rib 42 is formed on the inner surface of the upper wall 31 at a position near the upper cylindrical boss 36. As shown in FIG. 9, the free end of the rib 42 projects inward from a plane including the end surface 40a of the ridge 40 and the end surface of the cylindrical boss 36.

Figure 10:
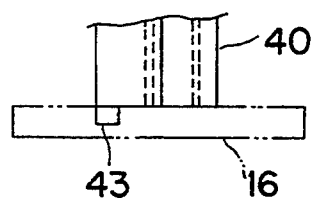
FIG. 10 is a view taken along the direction indicated by the arrow X in FIG. 7.

As shown in FIG. 10, a rib 43 is formed contiguously with the lower end of the ridge 40 and the free end of the rib 43 projects inwardly from a plane including the end surface 40a of the ridge 40.

Thus, three ribs projecting inwardly from the plane including the end surface 40a of the ridge 40, i.e., the ribs 41, 42 and 43 are formed in the front portion of the ridge 40, and near the upper end and the lower end, respectively, of the ridge 40.

The chain cover 12 is integrally provided with the three ribs 41, 42, 43 and having simple shapes can be formed in an integral member.

Figure 11:
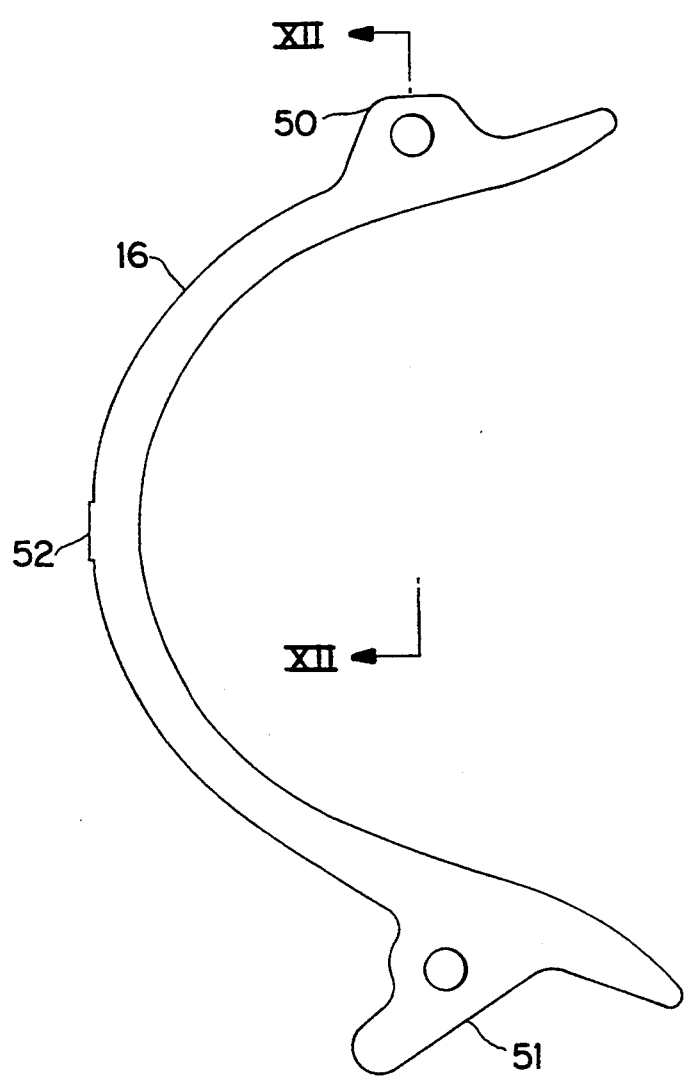
FIG. 11 is a front view of a chain guide member.
Figure 12:
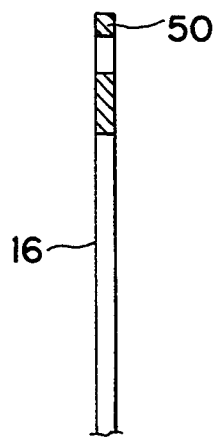
FIG. 12 is a sectional view taken on line XII—XII in FIG. 11.

As shown in FIGS. 11 and 12, the chain guide member 16 is formed by processing a steel plate and has a substantially semicircular shape. The chain guide member 16 has a trapezoidal protrusion 50 provided with a hole and formed, in a portion of the outer edge near the upper end thereof, and a triangular protrusion 51 provided with a hole and formed in a portion of the outer edge near the lower end thereof.

The middle portion of the outer edge of the chain guide member 16 protrudes slightly to form a flat protrusion 52. The chain guide member 16 can elastically be deformed so that the width of its open end, i.e., the distance between the opposite ends thereof, is changed. When the chain guide member 16 is deformed elastically by pressing the opposite ends thereof toward each other and mounted in place so as to open rearwardly, the chain guide member 16 extends along the chain 15 wound round the driving sprocket wheel 14.

When the chain guide member 16 is thus elastically deformed, put in place on the end surface 40a of the ridge 40 formed on the inner surface of the chain cover 12 with the flat protrusion 52 abutting against the rear surface of the rib 41 as shown in FIGS. 6 and 8, in which the chain guide member 16 is indicated by imaginary lines, with the inclined edge of the upper trapezoidal protrusion 50 positioned opposite to the rib 42 and with the lower inclined edge of the lower triangular protrusion 51 positioned opposite to the rib 43, and allowed to snap back toward its unstressed position, the trapezoidal protrusion 50 abuts against the rib 42 as shown in FIGS. 7 and 9, in which the chain guide member 16 is indicated by imaginary lines, and the triangular protrusion 51 abuts against the rib 43 as shown in FIGS. 7 and 10, in which the chain guide member 16 is indicated by imaginary lines, and the chain guide member 16 is held on the inner surface of the chain cover 12 by its own resilience.

Although the resilience of the thus elastically deformed chain guide member 16 tries to push the chain guide member 16 forward because the inclined edge of the trapezoidal protrusion 50 is in contact with the rib 42, and the inclined edge of the triangular protrusion 51 is in contact with the rib 43, the rib 41 restrains the chain guide member 16 from forward movement and, consequently, the chain guide member 16 is held in place.

Thus, the chain guide member 16 can easily be put on the inner surface of the chain cover 12 in a predetermined shape for temporary assembling.

In this state, the protrusions 50 and 51 of the chain guide member 16 are seated on the end surfaces of the cylindrical bosses 36 and 38 with the holes of the protrusions 50 and 51 in alignment with holes formed in the cylindrical bosses 36 and 38, respectively.

Even if the chain cover 12 is held with its inner surface facing down after temporarily assembling the chain case 12 and the chain guide member 16, the chain guide member 16 will not fall off the chain cover 12 because the chain guide member 16 is resiliently pressed against the three ribs 41, 42 and 43. Therefore, the chain cover 12 holding the chain guide member 16 can easily be attached to the transmission case 11, which improves the efficiency of the assembling work.

When the chain cover 12 temporarily holding the chain guide member 16 is placed on the surface of the left sidewall of the transmission case 11 so as to cover the driving sprocket wheel 14 and the front portion of the chain 15 wound round the driving sprocket wheel 14, the chain guide member 16 is seated on a circular rib 11a, FIGS. 2 and 3, the protrusions 50 and 51 are seated on the internally threaded bosses 11b of the transmission case 11, and the chain guide member 16 is held between the chain cover 12 and the transmission case 11. Then, a screw 60 is inserted through the lower cylindrical boss 38 and the hole of the protrusion 51 of the chain guide member 16 and is screwed in the internally threaded boss 11b of the transmission case 11 to fasten the chain cover 12 together with the chain guide member 16 to the transmission case 11.

Although not shown in the drawings, a screw is inserted through the upper cylindrical boss 36 of the chain cover 12 and the hole of the protrusion 50 Of the chain guide 50 and is screwed in the internally threaded boss of the transmission case 11 to fasten the chain cover 12 together with the chain guide member 16 to the transmission case 11.

In this embodiment, the chain guide member 16 is elastically deformed so that the width of its open end is reduced and put to the inner surfaces of the ribs 41, 42 and 43. It is also possible to form ribs on the inner surface of the chain cover and to form a chain guide member in a shape so that the chain guide member will be in contact with the outer surfaces of the ribs when the chain guide member is elastically deformed so that the width of its open end is increased and mounted in place on the chain cover.

In the latter case, the ribs of the chain cover lie on the inner side of the circular chain guide member and hence there is the possibility that the ribs are worn out by the chain. However, since the chain guide member is fastened together with the chain cover to the transmission case with screws, no problem arises even if the ribs are worn out.

The chain cover and the chain guide member can temporarily be assembled when the chain cover is provided with at least two ribs.

According to the present invention, the ribs can be formed integrally with the chain cover, the chain guide member can easily and firmly be positioned on the chain cover by utilizing the resilience of the chain guide member, which improves the efficiency of the assembling work.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A chain guide structure for guiding a chain wound around a driving sprocket supported on a sidewall of a crankcase and mounted within a cover attached to the sidewall, said chain guide structure comprising:

an elastic chain guide member having a substantially semicircular shape with an open end opening towards a direction of rotation of the chain and supported on an inner surface of the cover so as to extend along the chain; and at least two ribs formed on an inner surface of the cover so as to hold the chain guide member firmly by elastically deforming the chain guide member so that a width of the open end of the chain guide member is changed.

2. The chain guide structure for guiding a chain according to claim 1, wherein an upper wall of said cover includes at least a first rib formed on an inner surface thereof.

3. The chain guide structure for guiding a chain according to claim 2, wherein said first rib is formed in substantially a central portion of said cover.

4. The chain guide structure for guiding a chain according to claim 1, wherein a lower wall of said cover includes at least a second rib formed on an inner surface thereof.

5. The chain guide structure for guiding a chain according to claim 4, wherein said second rib is formed in substantially a central portion of said cover.

6. The chain guide structure for guiding a chain according to claim 1, and further including a first boss positioned on an inner surface of an upper wall of said cover.

7. The chain guide structure for guiding a chain according to claim 6, and further including a second boss positioned on an inner surface of a lower wall of said cover.

8. The chain guide structure for guiding a chain according to claim 7, and further including a ridge portion formed on said inner surface of said cover, said ridge extending from said first boss to said second boss.

9. The chain guide structure for guiding a chain according to claim 8, and further including a third rib positioned along a length of said ridge portion.

10. The chain guide structure for guiding a chain according to claim 9, wherein said third rib is positioned at approximately a central portion along a length of said ridge portion.

11. The chain guide structure for guiding a chain according to claim 1, wherein said elastic chain guide member includes a first end and a second end, a projection being formed on said first end of said elastic chain guide member for engagement with one of said ribs formed on said inner surface of said cover for retaining the projection relative to said cover.

12. The chain guide structure for guiding a chain according to claim 11, wherein said projection is a trapezoidal projection.

13. The chain guide structure for guiding a chain according to claim 1, wherein said elastic chain guide member includes a first end and a second end, a projection being formed on the second end of said elastic chain guide member for engagement with one of said ribs formed on said inner surface of said cover for retaining the projection relative to said cover.

14. The chain guide structure for guiding a chain according to claim 13, wherein said projection is a triangular projection.

15. The chain guide structure for guiding a chain according to claim 1, and further including a projection extending from a side wall of said cover in a direction towards said driving sprocket.

16. A chain guide structure for mounting within a cover comprising:

a chain guide member having a normal first predetermined shape with an opening formed between a first end and a second end of said chain guide member; and at least two ribs formed on an inner surface of the cover so as to hold the chain guide member firmly by elastically deforming the chain guide member so that a width of the open end of the chain guide member is changed from said normal first predetermined shape.

17. The chain guide structure for guiding a chain according to claim 16, wherein an upper wall of said cover includes at least a first rib formed on an inner surface thereof.

18. The chain guide structure for guiding a chain according to claim 17, wherein said first rib is formed in substantially a central portion of said cover.

19. The chain guide structure for guiding a chain according to claim 16, wherein a lower wall of said cover includes at least a second rib formed on an inner surface thereof.

20. The chain guide structure for guiding a chain according to claim 19, wherein said second rib is formed in substantially a central portion of said cover.

21. The chain guide structure for guiding a chain according to claim 16, and further including a first boss positioned on an inner surface of an upper wall of said cover.

22. The chain guide structure for guiding a chain according to claim 21, and further including a second boss positioned on an inner surface of a lower wall of said cover.

23. The chain guide structure for guiding a chain according to claim 22, and further including a ridge portion formed on said inner surface of said cover, said ridge extending from said first boss to said second boss.

24. The chain guide structure for guiding a chain according to claim 23, and further including a third rib positioned along a length of said ridge portion.

25. The chain guide structure for guiding a chain according to claim 24, wherein said third rib is positioned at approximately a central portion along a length of said ridge portion.

26. The chain guide structure for guiding a chain according to claim 16, wherein said chain guide member includes a first end and a second end, a projection being formed on said first end of said elastic chain guide member for engagement with one of said ribs formed on said inner surface of said cover for retaining the projection relative to said cover.

27. The chain guide structure for guiding a chain according to claim 26, wherein said projection is a trapezoidal projection.

28. The chain guide structure for guiding a chain according to claim 16, wherein said elastic chain guide member includes a first end and a second end, a projection being formed on the second end of said elastic chain guide member for engagement with one of said ribs formed on said inner surface of said cover for retaining the projection relative to said cover.

29. The chain guide structure for guiding a chain according to claim 28, wherein said projection is a triangular projection.

30. The chain guide structure for guiding a chain according to claim 16, and further including a projection extending from a side wall of said cover in a direction towards said driving sprocket.

* * * * *